United States Patent
Ozawa et al.

(10) Patent No.: US 11,739,211 B2
(45) Date of Patent: Aug. 29, 2023

(54) RESIN COMPOSITION, MOLDED PRODUCT AND ITS USE

(71) Applicant: AGC Inc., Chiyoda-ku (JP)

(72) Inventors: Norio Ozawa, Chiyoda-ku (JP); Tomoya Hosoda, Chiyoda-ku (JP); Takashi Sato, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 227 days.

(21) Appl. No.: 16/992,180

(22) Filed: Aug. 13, 2020

(65) Prior Publication Data

US 2020/0369878 A1 Nov. 26, 2020

Related U.S. Application Data

(63) Continuation of application No. PCT/JP2019/015677, filed on Apr. 10, 2019.

(30) Foreign Application Priority Data

Apr. 13, 2018 (JP) ................................ 2018-077652

(51) Int. Cl.
*C08L 71/00* (2006.01)

(52) U.S. Cl.
CPC ........... *C08L 71/00* (2013.01); *C08L 2203/02* (2013.01)

(58) Field of Classification Search
CPC ...... C08L 27/12; C08L 71/00; C08L 2203/02; C08G 2650/40
See application file for complete search history.

(56) References Cited

U.S. PATENT DOCUMENTS

| | | | |
|---|---|---|---|
| 2013/0010981 A1 | 5/2013 | Xie et al. | |
| 2015/0259525 A1 | 9/2015 | Mutsuda et al. | |
| 2016/0163413 A1 | 6/2016 | Ueda et al. | |
| 2018/0282499 A1 | 10/2018 | Hosoda et al. | |
| 2019/0055390 A1 | 2/2019 | Sato et al. | |

FOREIGN PATENT DOCUMENTS

| | | |
|---|---|---|
| JP | 2006-274073 A | 10/2006 |
| JP | 2009-286956 A | 12/2009 |
| JP | 2015-042740 A | 3/2015 |
| WO | WO 2012/005133 A1 | 1/2012 |
| WO | WO 2013/088967 A1 | 6/2013 |
| WO | WO 2014/034493 A1 | 3/2014 |
| WO | WO 2017/122735 A1 | 7/2017 |
| WO | WO 2017/188280 A1 | 11/2017 |

OTHER PUBLICATIONS

International Search Report dated Jul. 16, 2019 in PCT/JP2019/015677 filed on Apr. 10, 2019, 2 pages.

*Primary Examiner* — Hui H Chin

(74) *Attorney, Agent, or Firm* — Oblon, McClelland, Maier & Neustadt, L.L.P.

(57) ABSTRACT

To provide a molded product which is excellent in impact resistance, flexibility and bending resistance without impairing the characteristics (heat resistance, mechanical properties, etc.) of a polyaryletherketone, and has little appearance defects, and a resin composition, whereby it is possible to obtain such a molded product. This resin composition comprises a polyaryletherketone and a fluorinated elastomer. The ratio ($MFR_A/MFR_B$) of the melt flow rate $MFR_A$ of the polyaryletherketone at a temperature of 372° C. under a load of 49 N to the melt flow rate $MFR_B$ of the fluorinated elastomer at a temperature of 372° C. under a load of 49 N is from 0.2 to 5.0, and the proportion of the volume of the polyaryletherketone in the total of the volume of the polyaryletherketone and the volume of the fluorinated elastomer is from 60 to 97 vol %.

12 Claims, No Drawings

RESIN COMPOSITION, MOLDED PRODUCT AND ITS USE

TECHNICAL FIELD

The present invention relates to a resin composition, a molded product and its use.

BACKGROUND ART

Polyaryletherketone (polyetheretherketone, polyetherketone, polyetherketoneketone, etc.) is widely used in various fields as a material for molded products such as sliding members, because it is excellent in heat resistance, mechanical properties, etc.

However, the molded product of polyaryletherketone has insufficient impact resistance at room temperature or low temperature. Further, the molded product of polyaryletherketone has insufficient flexibility depending on the application.

The following has been proposed as a resin composition capable of obtaining a molded product having improved impact resistance without impairing the properties of polyaryletherketone.

A resin composition comprising a polyaryletherketone and a fluorinated elastomer, wherein the fluorinated elastomer is dispersed in the polyaryletherketone, the number average particle diameter of the fluorinated elastomer is from 1 to 300 μm, the volume ratio of the polyaryletherketone to the fluorinated elastomer is from 97:3 to 55:45, and the resin composition has a bending elastic modulus of from 1,000 to 3,700 MPa (Patent Document 1).

PRIOR ART DOCUMENT

Patent Document

Patent Document 1: WO2017/188280

DISCLOSURE OF INVENTION

Technical Problem

Recently, polyaryletherketone has come to be used not only as an injection molded product but also as an extrusion molded product such as a film, a tube, a fiber, etc. However, the resin composition described in Patent Document 1 has insufficient moldability at the time of extrusion molding. Therefore, the following problems occur.

The appearance of the extruded product is not good due to unevenness formed on the surface.

In the case of a thin film or tube, breakage and internal defects are likely to occur during the molding process, and the mechanical properties and bending resistance of the extruded product become insufficient.

In the case of molding fine fibers, yarn breakage is likely to occur.

The present invention is to provide a molded product which is excellent in impact resistance, flexibility and bending resistance without impairing the properties (heat resistance, mechanical properties, etc.) of polyaryletherketone, has a low dielectric constant, and has little appearance defects (defects), and a resin composition capable of obtaining such a molded product.

Solution to Problem

The present invention has the following embodiments.

<1> A resin composition comprising a polyaryletherketone and a fluorinated elastomer, wherein the ratio ($MFR_A/MFR_B$) of the melt flow rate $MFR_A$ of the polyaryletherketone at a temperature of 372° C. under a load of 49 N, to the melt flow rate $MFR_B$ of the fluorinated elastomer at a temperature of 372° C. under a load of 49 N, is from 0.2 to 5.0, and the proportion of the volume of the polyaryletherketone in the total of the volume of the polyaryletherketone and the volume of the fluorinated elastomer, is from 60 to 97 vol %.

<2> The resin composition according to <1>, wherein the fluorinated elastomer is dispersed in the polyaryletherketone, and the number average particle diameter of the dispersed fluorinated elastomer is from 0.5 to 5 μm.

<3> The resin composition according to <1> or <2>, wherein the fluorinated elastomer is a fluorinated elastic copolymer having units based on at least one type of monomer selected from the group consisting of tetrafluoroethylene, hexafluoropropylene, vinylidene fluoride and chlorotrifluoroethylene.

<4> The resin composition according to <3>, wherein the fluorinated elastomer is a fluorinated elastic copolymer which further has units based on a monomer selected from the group consisting of ethylene, propylene, a perfluoro (alkyl vinyl ether), vinyl fluoride, 1,2-difluoroethylene, 1,1,2-trifluoroethylene, 3,3,3-trifluoro-1-propylene, 1,3,3,3-tetrafluoropropylene and 2,3,3,3-tetrafluoropropylene.

<5> The resin composition according to any one of <1> to <4>, wherein the fluorinated elastomer is selected from the group consisting of a copolymer having units based on tetrafluoroethylene and units based on propylene, a copolymer having units based on hexafluoropropylene and units based on vinylidene fluoride, and a copolymer having units based on tetrafluoroethylene and units based on a compound represented by the following formula I:

$CF_2\!=\!CF(OR^F)$ 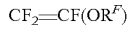 Formula I where $R^F$ is a $C_{1-8}$ linear or branched perfluoroalkyl group.

<6> The resin composition according to any one of <1> to <5>, wherein the polyaryletherketone is selected from the group consisting of polyetherketone, polyetheretherketone and polyetherketoneketone.

<7> A molded product obtained by molding the resin composition as defined in any one of <1> to <6>.

<8> The molded product according to <7>, which is a film, a tube or a fiber.

<9> The molded product according to <7>, which is a film having a thickness of from 1 to 100 μm.

<10> A speaker diaphragm comprising a film formed by molding the resin composition as defined in any one of <1> to <6>.

<11> A medical catheter comprising a tube formed by molding the resin composition as defined in any one of <1> to <6>.

Advantageous Effects of Invention

According to the resin composition of the present invention, it is possible to obtain a molded product which is excellent in impact resistance, flexibility and bending resistance without impairing the properties (heat resistance, mechanical properties, etc.) of polyaryletherketone, has a low dielectric constant and has little appearance defects (defects).

The molded product of the present invention is excellent in impact resistance, flexibility and bending resistance without impairing the properties (heat resistance, mechanical properties, etc.) of polyaryletherketone, and has little appearance defects (defects).

DESCRIPTION OF EMBODIMENTS

The meanings and definitions of the terms in this specification are as follows.

The "melt flow rate" is a melt flow rate (MFR) measured in accordance with ASTM D3307, and is the mass (g) of the polyaryletherketone or the fluorinated elastomer which flows out from a nozzle having a diameter of 2 mm and a length of 8 mm in 10 minutes under the conditions of a temperature of 372° C. and a load of 49 N.

The "volume" of the polyaryletherketone or the fluorinated elastomer is a value calculated by dividing the mass (g) of the polyaryletherketone or the fluorinated elastomer by its specific gravity (g/cm$^3$).

The "specific gravity" of the polyaryletherketone or the fluorinated elastomer is a value measured at 23° C. by an underwater replacement (suspension) method.

The "number average particle diameter" of the fluorinated elastomer in the resin composition is a value obtained by measuring the maximum diameters of 100 particles randomly selected by observing a molded product of the resin composition by a scanning electron microscope, and arithmetically averaging them.

The "number average particle diameter" of the fluorinated elastomer before melt-kneading is a value obtained by measuring the maximum diameters of 100 particles randomly selected by observing the fluorinated elastomer by an optical microscope, and arithmetically averaging them.

The "flexural modulus" of the molded product is a value measured in accordance with ASTM D790.

The "melting point" of the polyaryletherketone is a temperature corresponding to the maximum value of the melting peak measured by a differential scanning calorimetry (DSC) method.

The "fluorine content" in the fluorinated elastomer indicates the ratio of the mass of fluorine atoms to the total mass of all atoms constituting the fluorinated elastomer. The fluorine content is a value calculated from the molar ratios of the respective units in the fluorinated elastic copolymer, obtained by melt NMR measurement and total fluorine content measurement.

The "Mooney viscosity (ML$_{1+10}$, 121° C.)" of the fluorinated elastomer is a value measured in accordance with JIS K6300-1: 2000 (corresponding international standard ISO 289-1: 2005, ISO 289-2: 1994).

A "unit based on a monomer" is a generic term for an atomic group directly formed by polymerization of one molecule of the monomer and an atomic group obtainable by chemically converting a part of said atomic group. In the present specification, a unit based on a monomer is simply referred to also as a monomer unit. For example, a unit based on TFE is referred to also as a TFE unit.

A "monomer" means a compound having a polymerizable carbon-carbon double bond.

<Resin Composition>

The resin composition of the present invention comprises a polyaryletherketone and a fluorinated elastomer.

The resin composition of the present invention may contain components (hereinafter referred to as "other components") other than the polyaryletherketone and the fluorinated elastomer, as the case requires, within a range not impair the effects of the present invention.

The proportion of the volume of the polyaryletherketone in the total of the volume of the polyaryletherketone and the volume of the fluorinated elastomer, is from 60 to 97 vol %, preferably from 60 to 95 vol %, more preferably from 60 to 93 vol %, further preferably from 65 to 90 vol %. When the proportion of the volume of the polyaryletherketone is at least the lower limit value in the above range, a molded product excellent in heat resistance and mechanical properties can be obtained. When the proportion of the volume of the polyaryletherketone is at most the upper limit value in the above range, a molded product excellent in flexibility and impact resistance can be obtained.

The proportion of the volume of the fluorinated elastomer in the total of the volume of the polyaryletherketone and the volume of the fluorinated elastomer, is from 3 to 40 vol %, preferably from 5 to 40 vol %, more preferably from 7 to 40 vol %, further preferably from 10 to 35 vol %. When the proportion of the volume of the fluorinated elastomer is at least the lower limit value in the above range, a molded product excellent in flexibility and impact resistance can be obtained. When the proportion of the volume of the fluorinated elastomer is at most the upper limit value in the above range, a molded product excellent in heat resistance and mechanical properties can be obtained.

In the volume of the resin composition, the total of the volume of the polyaryletherketone and the volume of the fluorinated elastomer is preferably from 50 to 100 vol %, more preferably from 60 to 100 vol %, further preferably from 70 to 100 vol %. When the total of the volume of the polyaryletherketone and the volume of the fluorinated elastomer is at least the lower limit value in the above range, the molded product can sufficiently exhibit heat resistance, mechanical properties, flexibility and impact resistance. In a case where the resin composition contains other components, if the total of the volume of the polyaryletherketone and the volume of the fluorinated elastomer is at most 99 vol %, it is possible to impart new properties derived from other components to the molded product.

The total of volumes of other components in the volume of the resin composition, is preferably from 0 to 50 vol %, more preferably from 0 to 40 vol %, further preferably from 0 to 30 vol %.

The ratio (MFR$_A$/MFR$_B$) of the melt flow rate MFR$_A$ of the polyaryletherketone at a temperature of 372° C. under a load of 49N, to the melt flow rate MFR$_B$ of the fluorinated elastomer at a temperature of 372° C. under a load of 49N, is from 0.2 to 5.0, preferably from 0.3 to 5.0, more preferably from 0.5 to 5.0, particularly preferably from 1.0 to 5.0, even more preferably from 1.7 to 5.0, most preferably from 2.0 to 5.0. When MFR$_A$/MFR$_B$ is within the above range, the number average particle diameter of the fluorinated elastomer becomes small, and the fluorinated elastomer tends to be uniformly dispersed in the resin composition. As a result, since the molding processability of the resin composition is improved, the appearance defects (defects) of the molded product tend to be little, and a molded product excellent in bending resistance and mechanical properties can be obtained.

In order to bring MFR$_A$/MFR$_B$ to be within the above range, MFR$_A$ is preferably from 1 to 100 g/10 minutes and MFR$_B$ is preferably from 5 to 20 g/10 minutes, and it is more preferred that MFR$_A$ is from 1.5 to 100 g/10 minutes and MFR$_B$ is from 5 to 20 g/10 minutes. The polyaryletherketone having MFR$_A$ within the above range may, for example, be Vestakeep L4000G, Vestakeep 3300G and Vestakeep 2000G manufactured by Daicel-Evonik Ltd. The fluorinated elastomer having $MFR_B$ within the above range may, for example, be AFLAS (registered trademark) 150FC manufactured by AGC Inc.

In the resin composition of the present invention, from the viewpoint of improving the moldability of the resin composition, it is preferred that the fluorinated elastomer is dispersed in the polyaryletherketone.

The number average particle diameter of the dispersed fluorinated elastomer is preferably from 0.5 to 5 μm, more preferably from 1 to 5 μm. When the number average particle diameter of the fluorinated elastomer is at least the lower limit value in the above range, the flexibility of the fluorinated elastomer in the resin composition can be sufficiently secured. When the number average particle diameter of the fluorinated elastomer is at most the upper limit value in the above range, the fluorinated elastomer will be uniformly dispersed in the polyaryletherketone. As a result, since the molding processability of the resin composition is improved, the appearance defects (defects) of the molded product tend to be little, and a molded product excellent in bending resistance and mechanical properties can be obtained.

As the resin composition of the present invention, when made into a test piece having a thickness of 3.2 mm, preferred is one having a flexural modulus of from 1 to 3.7 GPa, more preferably from 1.3 to 3.5 GPa, further preferably from 1.5 to 3.4 GPa, particularly preferably from 1.7 to 3.3 GPa. The flexural modulus being at most 3.7 GPa indicates that the fluorinated elastomer in the resin composition is not crosslinked or is substantially not crosslinked. When the flexural modulus is at least the lower limit value in the above range, the impact resistance of the molded product will be further improved while maintaining the characteristics of the polyaryletherketone. When the flexural modulus is at most the upper limit value in the above range, the flexibility of the molded product will be further excellent, and as a result, the impact resistance of the molded product will be further improved.

(Polyaryletherketone)

As the polyaryletherketone, from the viewpoint of mechanical properties and heat resistance, polyetherketone (hereinafter referred to also as "PEK"), polyetheretherketone (hereinafter referred to also as "PEEK") or polyetherketoneketone (hereinafter referred to also as "PEKK") is preferred, and PEEK is particularly preferred.

As the polyaryletherketone, two or more types may be used in combination, but it is preferred to use one type alone.

The melting point of the polyaryletherketone is preferably from 200 to 430° C., more preferably from 250 to 400° C., further preferably from 280 to 380° C. When the melting point of the polyaryletherketone is at least the lower limit value in the above range, the heat resistance of the molded product will be further excellent. When the melting point of the polyaryletherketone is at most the upper limit value in the above range, it is possible to suppress deterioration of physical properties due to thermal decomposition of the fluorinated elastomer at the time of melt-kneading, and it is possible to maintain the properties (flexibility, impact resistance, chemical resistance, etc.) of the fluorinated elastomer.

The polyaryletherketone may be one which is commercially available, or may be one produced from various raw materials by a known method.

(Fluorinated Elastomer)

The fluorinated elastomer is preferably a fluorinated elastic copolymer having units based on at least one type of monomer (hereinafter referred to also as "monomer m1") selected from the group consisting of tetrafluoroethylene (hereinafter referred to also as "TFE"), hexafluoropropylene (hereinafter referred to also as "HFP"), vinylidene fluoride (hereinafter referred to also as "VdF") and chlorotrifluoroethylene (hereinafter referred to also as "CTFE").

The fluorinated elastomer is an elastic copolymer having no melting point and showing a storage elastic modulus G' of at least 80 at 100° C. and 50 cpm as measured in accordance with ASTM D6204, and is distinguished from a fluororesin.

As the fluorinated elastomer, two or more types may be used in combination, but it is preferred to use one type alone.

The fluorinated elastomer may be a fluorinated elastic copolymer composed solely of two or three types of units selected from the group consisting of TFE units, HFP units, VdF units and CTFE units, or may be a fluorinated elastic copolymer comprising units based on the monomer m1 and at least one type of units based on the following monomer m2 which is copolymerizable with the monomer m1.

The monomer m2 is a monomer selected from the group consisting of ethylene (hereinafter referred to also as "E"), propylene (hereinafter referred to also as "P"), a perfluoro (alkyl vinyl ether) (hereinafter referred to also as "PAVE"), vinyl fluoride (hereinafter referred to also as "VF"), 1,2-difluoroethylene (hereinafter referred to also as "DiFE"), 1,1,2-trifluoroethylene (hereinafter referred to as "TrFE"), 3,3,3-trifluoro-1-propylene (hereinafter referred to also as "TFP"), 1,3,3,3-tetrafluoropropylene and 2,3,3,3-tetrafluoropropylene.

PAVE is a compound represented by the following formula I.

$$CF_2=CF(OR^F) \qquad \text{Formula I}$$

where $R^F$ is a $C_{1-8}$ linear or branched perfluoroalkyl group.

PAVE may be perfluoro(methyl vinyl ether) (hereinafter referred to also as "PMVE"), perfluoro(ethyl vinyl ether) (hereinafter referred to also as "PEVE"), perfluoro(propyl vinyl ether) (hereinafter referred to also as "PPVE") or perfluoro(butyl vinyl ether) (hereinafter referred to also as "PBVE").

The fluorinated elastomer may have at least one type of units based on a monomer (referred to also as "monomer m3") other than the monomer m1 and the monomer m2, which is copolymerizable with the monomer m1 and of which the copolymer with the monomer m1 becomes an elastic copolymer.

The proportion of units based on the monomer m3 is preferably from 0 to 20 mol %, more preferably from 0 to 5 mol %, particularly preferably 0 mol %, in all units constituting the fluorinated elastomer.

In the fluorinated elastomer, it is preferred that all units constituting the fluorinated elastomer are composed of two or three types of units based on the monomer m1, or composed of at least one type of units based on the monomer m1 and at least one type of units based on the monomer m2. However, it may have units other than these, as impurities, etc., so long as they do not affect the properties of the resin composition of the present invention.

A fluorinated elastic copolymer composed of two or three types of units based on the monomer m1, and a fluorinated elastic copolymer composed of at least one type of units based on the monomer m1 and at least one type of units based on the monomer m2, will contribute to the flexibility of the molded product.

As the fluorinated elastomer, the following three types of copolymers may be mentioned. The total proportion of the respective units specifically shown in the following three types of copolymers, is preferably at least 50 mol %, in all units constituting the copolymers.

A copolymer having TFE units and P units (hereinafter referred to also as "TFE/P-containing copolymer"), A copolymer having HFP units and VdF units (but excluding one having P units) (hereinafter referred to also as "HFP/VdF-containing copolymer"), A copolymer having TFE units and PAVE units (but excluding one having P units or VdF units) (hereinafter referred to also as "TFE/PAVE-containing copolymer).

As the TFE/P-containing copolymer, the following ones may be mentioned.

TFE/P (meaning a copolymer composed of TFE units and P units; the same applies to others), TFE/P/VF, TFE/P/VdF, TFE/P/E, TFE/P/TFP, TFE/P/PAVE, TFE/P/1,3,3,3-tetrafluoropropene, TFE/P/2,3,3,3-tetrafluoropropene, TFE/P/TrFE, TFE/P/DiFE, TFE/P/VdF/TFP, and TFE/P/VdF/PAVE, and among them, TFE/P is preferred.

The HFP/VdF-containing copolymer may be HFP/VdF, TFE/VdF/HFP, TFE/VdF/HFP/TFP, TFE/VdF/HFP/PAVE, VdF/HFP/TFP and VdF/HFP/PAVE. Among them, HFP/VdF is preferred.

The TFE/PAVE-containing copolymer may be TFE/PAVE, and particularly, TFE/PMVE and TFE/PMVE/PPVE are preferred where PAVE is PMVE or PPVE, and among them, TFE/PMVE is particularly preferred.

Other examples of the fluorinated elastomer may be TFE/VdF/2,3,3,3-tetrafluoropropylene, VdF/PAVE, VdF/2,3,3,3-tetrafluoropropylene, and E/HFP.

As the fluorinated elastomer, a TFE/P-containing copolymer, a HFP/VdF-containing copolymer and a TFE/PAVE-containing copolymer are preferred, a TFE/P-containing copolymer is more preferred, and TFE/P is particularly preferred. TFE/P has good thermal stability at the time of melt-kneading and stable transportability at the time of melt-kneading. Further, coloring and foaming of the molded product of the present invention will be reduced.

The ratio of the respective units constituting the fluorinated elastomer is preferably in the following range from the viewpoint of readily contributing to the flexibility of the molded product.

The molar ratio of the respective units in TFE/P (TFE:P, the same applies below) is preferably 30 to 80:70 to 20, more preferably 40 to 70:60 to 30, further preferably 60 to 50:40 to 50.

In TFE/P/VF, TFE:P:VF is preferably 30 to 60:60 to 20:0.05 to 40.

In TFE/P/VdF, TFE:P:VdF is preferably 30 to 60:60 to 20:0.05 to 40.

In TFE/P/E, TFE:P:E is preferably 20 to 60:70 to 30:0.05 to 40.

In TFE/P/TFP, TFE:P:TFP is preferably 30 to 60:60 to 30:0.05 to 20.

In TFE/P/PAVE, TFE:P:PAVE is preferably 40 to 70:60 to 29.95:0.05 to 20.

In TFE/P/1,3,3,3-tetrafluoropropene, TFE:P:1,3,3,3-tetrafluoropropene is preferably 30 to 60:60 to 20:0.05 to 40.

In TFE/P/2,3,3,3-tetrafluoropropene, TFE:P:2,3,3,3-tetrafluoropropene is preferably 30 to 60:60 to 20:0.05 to 40.

In TFE/P/TrFE, TFE:P:TrFE is preferably 30 to 60:60 to 20:0.05 to 40.

In TFE/P/DiFE, TFE:P:DiFE is preferably 30 to 60:60 to 20:0.05 to 40.

In TFE/P/VdF/TFP, TFE:P:VdF:TFP is preferably 30 to 60:60 to 20:0.05 to 40:0.05 to 20.

In TFE/P/VdF/PAVE, TFE:P:VdF:PAVE is preferably 30 to 70:60 to 20:0.05 to 40:0.05 to 20.

In HFP/VdF, HFP:VdF is preferably 99 to 5:1 to 95.

In TFE/VdF/HFP, TFE:VdF:HFP is preferably 20 to 60:1 to 40:20 to 60.

In TFE/VdF/HFP/TFP, TFE:VdF:HFP:TFP is preferably 30 to 60:0.05 to 40:60 to 20:0.05 to 20.

In TFE/VdF/HFP/PAVE, TFE:VdF:HFP:PAVE is preferably 30 to 70:60 to 20:0.05 to 40:0.05 to 20.

In VdF/HFP/TFP, VdF:HFP:TFP is preferably 1 to 90:95 to 5:0.05 to 20.

In VdF/HFP/PAVE, VdF:HFP:PAVE is preferably 20 to 90:9.95 to 70:0.05 to 20.

In TFE/PAVE, TFE:PAVE is preferably 40 to 70:60 to 30. When PAVE is PMVE, TFE:PMVE is preferably 40 to 70:60 to 30.

In TFE/PMVE/PPVE, TFE:PMVE:PPVE is preferably 40 to 70:3 to 57:3 to 57.

In TFE/VdF/2,3,3,3-tetrafluoropropylene, TFE:VdF:2,3,3,3-tetrafluoropropylene is preferably 1 to 30:30 to 90:5 to 60.

In VdF/PAVE, VdF:PAVE is preferably 3 to 95:97 to 5.

In VdF/2,3,3,3-tetrafluoropropylene, VdF:2,3,3,3-tetrafluoropropylene is preferably 30 to 95:70 to 5.

In E/HFP, E:HFP is preferably 40 to 60:60 to 40.

The fluorine content in the fluorinated elastomer is preferably from 50 to 74 mass %, more preferably from 55 to 70 mass %. The fluorine content is preferably from 57 to 60 mass % in TFE/P, from 66 to 71 mass % in HFP/VdF, and from 66 to 70 mass % in TFE/PMVE. When the fluorine content is at least the lower limit value in the above range, the heat resistance and chemical resistance of the molded product will be further excellent. When the fluorine content is at most the upper limit value in the above range, the flexibility of the molded product will be further excellent.

The number average molecular weight of the fluorinated elastomer is preferably from 10,000 to 1,500,000, more preferably from 20,000 to 1,000,000, further preferably from 20,000 to 800,000, particularly preferably from 50,000 to 600,000. When the number average molecular weight of the fluorinated elastomer is at least the lower limit value in the above range, the mechanical properties of the molded product will be further excellent. When the number average molecular weight of the fluorinated elastomer is at most the upper limit value in the above range, the flowability will be high, the dispersion in the polyaryletherketone will be good, and the flexibility of the molded product will be further excellent.

The Mooney viscosity ($ML_{1+10}$, 121° C.) of the fluorinated elastomer is preferably from 20 to 200, more preferably from 30 to 150, further preferably from 40 to 120. The Mooney viscosity is a measure for the molecular weight. The larger the Mooney viscosity, the larger the molecular weight, and the smaller the Mooney viscosity, the smaller the molecular weight. When the Mooney viscosity is within the above range, the moldability of the resin composition will be further excellent, and the mechanical properties of the molded body will be further excellent.

The fluorinated elastomer can be produced by polymerizing at least one type of monomer m1 and optionally at least one type of one or both of monomer m2 and monomer m3.

The polymerization method may be an emulsion polymerization method, a solution polymerization method, a suspension polymerization method, a bulk polymerization method, etc. An emulsion polymerization method in which monomers are polymerized in the presence of an aqueous medium and an emulsifier, is preferred, since adjustment of the number average molecular weight of the fluorinated elastic copolymer and the copolymer composition will be easy and the productivity will be excellent.

In the emulsion polymerization method, monomers are polymerized in the presence of an aqueous medium, an emulsifier and a radical polymerization initiator to obtain an elastomer latex. A pH adjusting agent may be added at the time of the polymerization of the monomers.

(Other Components)

Other components may be additives such as a filler, a plasticizer, a flame retardant, etc.

As other components, one type may be used alone, or two or more types may be used in combination.

The filler may be an inorganic filler, a polymer filler, etc.

As the inorganic filler, calcium carbonate, silicon oxide, titanium oxide, barium sulfate, zinc oxide, aluminum hydroxide, magnesium hydroxide, talc, mica, carbon black, white carbon, clay, carbon nanotube, glass fiber, carbon fiber, etc. may be mentioned.

The carbon black may be one commonly used as a filler for fluororubber, and specifically, furnace black, acetylene black, thermal black, channel black, graphite, etc. may be mentioned, furnace black is preferred. As the furnace black, HAF-LS carbon, HAF carbon, HAF-HS carbon, FEF carbon, GPF carbon, APF carbon, SRF-LM carbon, SRF-HM carbon, MT carbon, etc. may be mentioned, and MT carbon is preferred.

The polymer filler may be polycarbonate, polyethylene terephthalate, polybutylene terephthalate, polyarylate, polycaprolactone, a phenoxy resin, polysulfone, polyether sulfone, polyetherimide, polyamide 6, polyamide 66, polyamide 11, polyamide 12, polyamide 610, polyphenylene oxide, polyphenylene sulfide, polytetrafluoroethylene, an acrylonitrile-butadiene-styrene copolymer (ABS resin), polymethylmethacrylate, polypropylene, polyethylene, polybutadiene, a butadiene-styrene copolymer, an ethylene-propylene-diene rubber (EPDM), a styrene-butadiene block copolymer, a butadiene-acrylonitrile copolymer, an acrylic rubber, a styrene-maleic anhydride copolymer, a styrene-phenylmaleimide copolymer, etc.

In a case where the resin composition contains carbon black, the content of carbon black is preferably from 1 to 50 parts by mass, more preferably from 3 to 20 parts by mass, to 100 parts by mass of the fluorinated elastomer. When the content of carbon black is at least the lower limit value in the above range, the strength of the molded product will be further excellent, and the reinforcing effect due to the incorporation of carbon black will be sufficiently obtained. When the content of carbon black is at most the upper limit value in the above range, elongation of the molded product will be excellent. When the content of carbon black is within the above range, the balance between the strength and elongation of the molded product becomes good.

In a case where the resin composition contains a filler other than carbon black, the content of the filler other than carbon black is preferably from 5 to 200 parts by mass, more preferably from 10 to 100 parts by mass, to 100 parts by mass of the fluorinated elastomer.

In a case where the resin composition contains carbon black and a filler other than carbon black, the total content of the filler is preferably from 1 to 100 parts by mass, more preferably from 3 to 50 parts by mass, to 100 parts by mass of the fluorinated elastomer.

The plasticizer may be a phthalic acid ester, an adipic acid ester, etc.

The flame retardant may be aluminum hydroxide, magnesium hydroxide, magnesium carbonate, antimony trioxide, sodium antimonate, antimony pentoxide, a phosphazene compound, a phosphoric acid ester (triphenyl phosphate, tricresyl phosphate, trixylenyl phosphate, cresylphenyl phosphate, 2-ethylhexyl diphenyl phosphate, etc.), ammonium polyphosphate, melamine/melam/melem polyphosphate, red phosphorus, a molybdenum compound, a boric acid compound, polytetrafluoroethylene, etc.

(Method for Producing Resin Composition)

The resin composition is produced by melt-kneading the polyaryletherketone, the fluorinated elastomer and, as the case requires, other components.

In a case where other components are to be included in the resin composition, such other components may be added at the time of melt-kneading the polyaryletherketone and the fluorinated elastomer, or may be added after melt-kneading the polyaryletherketone and the fluorinated elastomer.

The fluorinated elastomer before melt-kneading is preferably crumb-shaped from the viewpoint of handling efficiency during compound preparation.

The number average particle diameter of the fluorinated elastomer before melt-kneading is preferably at most 10 mm, more preferably at most 8 mm, further preferably at most 6 mm. When the number average particle diameter of the fluorinated elastomer before melt-kneading is within the above range, the transportability by a screw during melt-kneading will be stabilized.

The volume ratio of the polyaryletherketone to the fluorinated elastomer in the melt-kneading is the same as the volume ratio of the polyaryletherketone to the fluorinated elastomer in the resin composition. When the proportion of the volume of the polyaryletherketone and the proportion of the volume of the fluorinated elastomer are within the above-mentioned ranges, the appearance of the strand obtainable at the time of melt-kneading does not become rough, and as a result, the pellets obtainable will be excellent in melt moldability. Further, if the proportion of the volume of the polyaryletherketone and the proportion of the volume of the fluorinated elastomer are within the above-mentioned ranges, when the proportion of the volume of the polyaryletherketone contained is within the above range, a molded product excellent in heat resistance, mechanical physical properties, flexibility and impact resistance can be obtained.

The melt-kneading device may be a known device having a melt-kneading function. The melt-kneading device is preferably a single-screw extruder or a twin-screw extruder which may be provided with a screw having a high kneading effect, more preferably a twin-screw extruder, particularly preferably a twin-screw extruder provided with a screw having a high kneading effect. As the screw having a high kneading effect, it is possible to select one having a sufficient kneading effect with respect to an object to be melt-kneaded and not giving an excessive shearing force. As such a melt-kneading device, Labo Plastomill kneader (manufactured by Toyo Seiki Seisaku-sho, Ltd.) may be mentioned.

As a method for supplying the polyaryletherketone and the fluorinated elastomer to the melt-kneading device, the polyaryletherketone and the fluorinated elastomer may be mixed in advance and supplied to the melt-kneading device, or the polyaryletherketone and the fluorinated elastomer may be separately supplied to the melt-kneading device.

In a case where other components are to be included in the resin composition, such other components may be mixed in advance with one of the polyaryletherketone and the fluorinated elastomer and supplied to the melt-kneading device, or they may be supplied to the melt-kneading device separately from the polyaryletherketone and the fluorinated elastomer. Further, other components may be added after melt-kneading the polyaryletherketone and the fluorinated elastomer.

The melt-kneading temperature is preferably set depending on the polyaryletherketone and the fluorinated elastomer. The melt-kneading temperature is preferably from 220 to 480° C., more preferably from 280 to 450° C., further preferably from 290 to 420° C., particularly preferably from 300 to 400° C.

The extrusion shear rate in melt-kneading is preferably set depending on the melt viscosity of the object to be melt-kneaded at the melt-kneading temperature. The extrusion shear rate in the melt-kneading is preferably from 3 to 2,500 $sec^{-1}$, more preferably from 10 to 2,000 $sec^{-1}$, further preferably from 15 to 1,500 $sec^{-1}$.

The residence time of the object to be melt-kneaded in the melt-kneading device is preferably from 10 to 290 seconds, more preferably from 20 to 240 seconds, further preferably from 30 to 210 seconds.

The melt-kneading is preferably carried out so that particles of the fluorinated elastomer having a number average particle diameter of from 1 to 5 μm will be dispersed in the polyaryletherketone. By suitably adjusting the melt-kneading temperature, the extrusion shear rate and the residence time of the object to be melt-kneaded in the melt-kneading device, it is possible to disperse the particles of the fluorinated elastomer having a number average particle diameter of from 1 to 5 μm in the polyaryletherketone.

By increasing the melt-kneading temperature, the fluorinated elastomer will be easily dispersed in the polyaryletherketone, and coarse particles of the fluorinated elastomer will be less likely to remain. By lowering the melt-kneading temperature, thermal decomposition of the fluorinated elastomer will be less likely to be promoted, the heat resistance of the resin composition will be further excellent, and the fluorinated elastomer will not be made too small in particle size.

By increasing the extrusion shear rate, the fluorinated elastomer tends to be easily dispersed in the polyaryletherketone, and coarse particles of the fluorinated elastomer will be less likely to remain. By reducing the extrusion shear rate, the fluorinated elastomer will not be made too small in particle size.

When the residence time of the object to be melt-kneaded in the melt-kneading device is prolonged, the fluorinated elastomer will be easily dispersed in the polyaryletherketone, and coarse particles of the fluorinated elastomer will be less likely to remain. When the residence time is shortened, the thermal decomposition of the fluorinated elastomer will be less likely to be promoted.

The melt-kneading is preferably carried out in the substantial absence of a crosslinking agent and a crosslinking aid. The melt-kneading being carried out in the substantial absence of a crosslinking agent and a crosslinking aid, means that melt-kneading is carried out without letting the fluorinated elastomer in the resin composition be substantially cross-linked. Whether or not the fluorinated elastomer in the resin composition is not substantially crosslinked, can be confirmed by the value of the flexural modulus of the resin composition. If the fluorinated elastomer is substantially crosslinked, the flexibility of the fluorinated elastomer will be lost, so that the flexural modulus of the molded body will exceed 3.7 GPa.

By carrying out melt-kneading in the substantial absence of a crosslinking agent and a crosslinking aid, it is possible to secure the flexibility of the fluorinated elastomer in the resin composition and to improve the impact resistance of the molded product.

A resin composition obtained by melt-kneading the object to be melt-kneaded containing the polyaryletherketone and the fluorinated elastomer, is melt-moldable and thus is useful as a material for a molded product.

The resin composition of the present invention may be powdered and used as a coating material. Uses of the coated articles may be uses as described in WO2015/182702.

The resin composition of the present invention is also useful as an additive for fiber-reinforced molded products or as a matrix resin for prepregs.

Advantageous Effects

In the resin composition of the present invention as described above, the proportion of the volume of the polyaryletherketone in the total of the volume of the polyaryletherketone and the volume of the fluorinated elastomer is from 60 to 97 vol %, whereby it is possible to obtain a molded product excellent in impact resistance and flexibility without impairing the properties (heat resistance, mechanical properties, etc.) of the polyaryletherketone.

Further, in the resin composition of the present invention, since the ratio ($MFR_A/MFR_B$) of the melt flow rate $MFR_A$ of the polyaryletherketone at a temperature of 372° C. under a load of 49 N to the melt flow rate $MFR_B$ of the fluorinated elastomer at a temperature of 372° C. under a load of 49 N, is from 0.2 to 5.0, the number average particle diameter of the fluorinated elastomer when dispersed in the polyaryletherketone will become small, so that it becomes easy for the fluorinated elastomer to be uniformly dispersed in the resin composition. As a result, since the molding processability of the resin composition will be improved, the appearance defects (defects) of the molded product will be little, and it will be possible to obtain a molded product excellent in bending resistance and mechanical properties.

<Molded Product>

The molded product of the present invention is one made by molding the resin composition of the present invention.

The shape of the molded product of the present invention is suitably selected depending on the form, the application, etc. of the molded product.

The form of the molded product of the present invention may be a sliding member, a seal material, a gear, an actuator, a piston, a bearing, a housing, an aircraft interior material, a fuel tube, a bush, a tube, a hose, a tank, a seal, a wire, an electric wire (a wire, a cable, etc.), an insulating coating material, a film, a sheet, a bottle, a fiber, etc.

Uses of the tube, hose, tank, seal and wire may be the uses as described in WO2015/182702. In addition, uses of the tube and hose may be tubes for excavating energy resources such as oil, natural gas, shale oil, etc.

The use of the insulating coating material for electric wires may be an insulating material for an electric wire for a motor coil or for a rectangular copper wire, particularly for a rectangular conductor in a drive motor of a hybrid vehicle (HEV) or an electric vehicle (EV). As the form of the insulating coating material for the rectangular conductor, a film is preferred. Further, as the use of the insulating coating material for electric wires, an insulating coating material for downhole cables for excavating energy resources (petroleum, natural gas, shale oil, etc.) may be mentioned.

The use of the film and sheet may be a speaker diaphragm, a plate for external damage/fractures, an insulating paper such as an adhesive tape for various electrical insulation (motor insulating paper, etc.), a sealing tape for oil/natural gas pipes, etc., or a release film at the time of molding composite materials having thermosetting properties and thermoplastic properties.

The molded product of the present invention may be used as being laminated or composited with another material. Another material may be a metal (iron, copper, stainless steel, etc.), glass, plastic, rubber, etc.

Specific examples of the plastic include those described in WO2015/182702, liquid crystal polymers, polyaryl ketones, polyether sulfones, polyphenyl sulfones, polyacetals, polyurethanes, etc. Polyamides include polyamide 6, polyamide 66, polyamide 46, polyamide 11, polyamide 12, polyamide 610, polyamide 612, polyamide 6/66 copolymer, polyamide 6/66/610 copolymer, polyamide MXD6, polyamide 6T, polyamide 9T, polyamide 6/6T copolymer, etc.

Since the resin composition of the present invention has good moldability and is suitable for extrusion molding, the molded article of the present invention is preferably an extrusion molded product such as a film, a tube or a fiber. The extruded product made by extruding the resin composition of the present invention has the following advantages.

Irregularities are less likely to be formed on the surface of the extruded product, and the appearance is good.

In the case of a thin film or tube, breakage or internal defects are less likely to occur during the molding process, and the mechanical properties and bending resistance of the extruded product will be sufficient.

In the case of molding fine fibers, thread breakage is less likely to occur.

The thickness of the film is preferably from 1 to 100 μm, more preferably from 2 to 80 μm, further preferably from 5 to 50 μm. When the thickness of the film is at least the lower limit value in the above range, breakage or internal defects during the molding process are less likely to occur, and the mechanical properties and bending resistance of the film will be further excellent. When the thickness of the film is at most the upper limit value in the above range, the film will be excellent in handling efficiency in the next step.

The extruded product made by extruding the resin composition of the present invention is excellent in impact resistance, flexibility and bending resistance without impairing the properties (heat resistance, mechanical properties, etc.) of the polyaryletherketone, and has little appearance defects (defects), and thus, it is preferably used for applications in which these characteristics are required.

In a case where the extruded product is a film, its use is preferably a speaker diaphragm provided with a film, a film for covering electric wires, a flexible printed circuit board, a heat-resistant roll for OA equipment, or a film for film impregnation of other fiber composite materials.

In a case where the extruded product is a tube, its use is preferably a medical catheter equipped with a tube, a wire coating, or piping for an analytical instrument.

In a case where the extruded product is a fiber, its use is preferably protective clothing or various filters.

The method for molding the resin composition may be an injection molding method, an extrusion molding method, a coextrusion molding method, a blow molding method, a compression molding method, a transfer molding method, a calendar molding method, etc. Since the resin composition of the present invention has good moldability, the extrusion molding method is preferred as the method for molding the resin composition.

In a case where the extrusion-molded product is a film, the extrusion molding method is preferably a T-die method or an inflation method. In the T-die method, the flow rate of the molten resin and the thickness of the film can be precisely controlled by adjusting the choke bar and lip in the T-die. In the inflation method, by introducing air from a circular die into the extruded product and expanding it to obtain a film, the thickness of the film can be made uniform.

In a case where the extrusion-molded product is a fiber, as the extrusion-molding method, a melt-spinning method is preferred.

The cylinder temperature in the extruder is preferably from 300 to 420° C., more preferably from 330 to 370° C. The die temperature is preferably from 350 to 420° C., more preferably from 350 to 380° C. When the temperatures are within the above ranges, the friction stress between the molten resin and the die will be reduced, whereby the extruded product will be excellent in the surface smoothness. Further, it is possible to suppress the decomposition of the resin due to the heat history during molding, whereby the extruded product will be excellent in the surface smoothness.

The extrusion shear rate in the extruder is preferably from 3 to 2,500 $\sec^{-1}$, more preferably from 10 to 1,000 $\sec^{-1}$, further preferably from 10 to 100 $\sec^{-1}$. The residence time of the resin composition in the extruder is preferably from 10 to 1,000 seconds, more preferably from 60 to 500 seconds.

<Prepreg>

The prepreg comprises a matrix resin and reinforcing fibers. Specifically, it is a sheet-shaped material having reinforcing fibers impregnated with a matrix resin, and can be said to be a sheet-shaped material having reinforcing fibers embedded in a matrix resin.

The prepreg in the present invention is one wherein the resin composition of the present invention is used as a matrix resin.

As the reinforcing fibers, continuous long fibers having a length of at least 10 mm are preferred from the viewpoint of mechanical properties of the fiber-reinforced molded product. The reinforcing fibers do not need to be continuous over the entire length of the prepreg in the length direction or over the entire width in the width direction, and may be divided in the middle.

As a processing form of the reinforcing fibers, one processed in the form of a sheet (hereinafter referred to also as a "reinforcing fiber sheet") is preferred from the viewpoint of mechanical properties of the fiber-reinforced molded product.

The reinforcing fiber sheet may be a reinforcing fiber bundle composed of a plurality of reinforcing fibers, a cloth formed by weaving the reinforcing fiber bundle, a unidirectional reinforcing fiber bundle having a plurality of reinforcing fibers aligned in one direction, a unidirectional cloth composed of the unidirectional reinforcing fiber bundle, one having these combined, one having a plurality of reinforcing fiber bundles stacked, etc.

The reinforcing fibers may be inorganic fibers, metal fibers, organic fibers, etc.

The inorganic fibers may be carbon fibers, graphite fibers, glass fibers, silicon carbide fibers, silicon nitride fibers, alumina fibers, silicon carbide fibers, boron fibers, etc.

The metal fibers may be aluminum fibers, brass fibers, stainless fibers, etc.

The organic fibers may be aromatic polyamide fibers, polyaramid fibers, polyparaphenylenebenzoxazole (PBO) fibers, polyphenylene sulfide fibers, polyester fibers, acrylic fibers, nylon fibers, polyethylene fibers, etc.

The reinforcing fibers may be ones having surface-treatment applied.

As the reinforcing fibers, one type may be used alone, or two or more types may be used in combination.

As the reinforcing fibers, carbon fibers are preferred from such a viewpoint that they have a small specific gravity, high strength and high elastic modulus.

<Fiber-Reinforced Molded Product>

The fiber-reinforced molded product is one formed by using the prepreg. The fiber-reinforced molded product may be one formed by using only the prepreg of the present invention, or may be a laminate formed by using the prepreg of the present invention and another prepreg, or may be a laminate formed by using the prepreg of the present invention and, as the case requires, another prepreg and a member other than a prepreg.

Another prepreg may be a prepreg in which the matrix resin contains a polyaryletherketone and does not contain a fluorinated elastomer, a prepreg in which the matrix resin contains a fluorinated elastomer and does not contain a polyaryletherketone, a prepreg in which the matrix resin is a resin or an elastomer other than a polyaryletherketone and a fluorinated elastomer, etc.

The member other than a prepreg may be a metal member, a film containing a polyaryletherketone, a film containing a fluorinated elastomer, a film containing a resin or an elastomer other than the polyaryletherketone and the fluorinated elastomer, etc.

The metal member may be a metal foil, various metal parts, etc. The metal may be iron, stainless steel, aluminum, copper, brass, nickel, zinc, etc. The shape of the metal member may be suitably selected according to the fiber-reinforced molded product.

The fiber-reinforced molded product can be produced by a usual heat and pressure molding treatment by using the prepreg.

Uses of the fiber-reinforced molded product may be uses as described in WO2015/182702, a housing for a smartphone, a core material of a power transmission line, a pressure container for storing fuel (hydrogen, gasoline, etc.) or oil, a repair or reinforcement sheet for tunnels or roads, etc. Uses of the fiber-reinforced molded product are preferably aircraft components, wind turbine blades, automobile outer panels, electronic device housings, trays, chassis, sports equipment (tennis racket frames, bats, golf shafts, fishing rods, bicycle frames, rims, wheels, cranks, etc.), etc.

EXAMPLES

In the following, the present invention will be described in detail with reference to Examples, but the present invention is not limited thereto.

Ex. 1 to 9 are Examples of the present invention, and Ex. 10 to 15 are Comparative Examples.

(Melting Point)

Using a differential scanning calorimeter (manufactured by Seiko Instruments Inc., DSC 7020), the melting peak when the polyaryletherketone was heated at a rate of 10° C./min was recorded, and the temperature corresponding to the maximum value was adopted as the melting point.

(Melt Flow Rate)

Using a melt indexer (X416, manufactured by Takara Kogyo Co., Ltd.), the mass (g) of the polyaryletherketone or the fluorinated elastomer flowing out in 10 minutes from a nozzle having a diameter of 2 mm and a length of 8 mm under the conditions of a temperature of 372° C. and a load of 49N, was measured in accordance with ASTM D3307.

(Preparation of Injection-Molded Product for Evaluation)

The resin composition was pre-dried under heating at 200° C. for 3 hours. Using an injection molding machine (manufactured by FANUC CORPORATION, AUTOSHOT C 30A), the resin composition was injection-molded at a cylinder temperature of 350° C. and a mold temperature of 170° C., to obtain an injection-molded product for evaluation, having a thickness of 3.2 mm.

(Flexural Modulus)

A test piece having a length of 60 mm and a width of 12.7 mm was cut out from the injection-molded product for evaluation. With respect to the test piece, using TENSILON (UTM-5T, manufactured by TOYO BALDWIN), the flexural modulus was measured at a distance between fulcrums of 40 mm at a speed of 1 mm/min in accordance with ASTM D790.

(Izod Impact Strength)

Using a contour machine (V-400, manufactured by Amada Co., Ltd.), the injection-molded product for evaluation was cut to obtain a sample having a height of 63 mm and a width of 13 mm. A notch was imparted at a height of 32 mm of the sample to obtain a test piece.

With respect to the test piece, using an Izod tester (manufactured by Toyo Seiki Seisaku-sho, Ltd.), the Izod impact strength was measured under the conditions of a hammer capacity of 2.75 J, a hammer load of 13.97N, a distance from the shaft center to the center of gravity being 10.54 cm, a distance from the shaft center to the striking point being 33.5 cm. The measurements were carried out at 23° C. and −40° C.

(Number Average Particle Diameter)

The injection molded product for evaluation was observed by a scanning electron microscope (S-4800, manufactured by Hitachi, Ltd.), and the maximum diameters of 100 particles randomly selected were measured and arithmetically averaged to obtain the number average particle diameter of the fluorinated elastomer in the resin composition.

(Preparation of Film for Evaluation) The resin composition was pre-dried under heating at 200° C. for 3 hours. Using a single-screw extruder (VS-30, manufactured by Tanabe Plastics Machinery Co., Ltd.) and a T-die with a width of 150 mm, the resin composition was extrusion-molded at a set resin temperature of 365° C., a rotation speed of 6 rpm, and a take-up speed of 1.0 m/min, to obtain a film for evaluation having a thickness of 30 μm.

(Film Appearance)

The film for evaluation was visually observed, and the film appearance was evaluated in accordance with the following standards.

○ (good): No unevenness is observed on the surface of the film.

x (poor): Unevenness or holes are observed on the surface of the film.

(Film Tensile Properties)

With respect to the film for evaluation, a tensile test was carried out at a tensile speed of 50 mm/min and a chuck distance of 70 mm in accordance with JIS K6251: 2010, to measure the elongation at break. The film tensile properties were evaluated according to the following standards.

(Bending Resistance)

In accordance with ASTM D2176, the resin composition was press-molded to obtain a press sheet having a thickness of 0.23 mm. From the press sheet, a test piece having a width of 12.5 mm, a length of 130 mm and a thickness of 0.23 mm was cut out. Using a MIT bending tester (MIT-DA, manufactured by Toyo Seiki Seisaku-sho, Ltd.), the test piece was bent under the conditions of a temperature of 23° C., a humidity of 50% RH, a load of 12.25 N, a bending angle of 135 degrees at each of left and right, a number of bending times per minute being 175 times, whereby the number of times until the test piece broken (MIT bending life) was obtained. The greater the number of times, the better the bending resistance.

(Dielectric Constant)

Using a melt heat press machine, the resin composition was press-molded to obtain a press sheet having a thickness of 0.24 mm. Referring to ASTM D2520, a PNA-L network analyzer (N5230A, manufactured by Agilent Technologies) and a cavity resonator (CP481, manufactured by Kanto Electronics Application Development Co., Ltd.) were used, and the dielectric constant of the press sheet was measured under the condition of a temperature of 23° C., a humidity of 50% RH and a frequency of 2.45 GHz. The dielectric constant of polyaryletherketone A-2 measured under the same conditions is 3.18.

(Deflection Temperature Under Load)

From the injection-molded product for evaluation, a strip-shaped test piece (length 127 mm×width 12.7 mm×thickness 3.2 mm) was cut out, and in accordance with ASTM D648, using HDT & VSPT TESTER manufactured by Toyo Seiki Seisaku-sho, Ltd., the temperature at which a predetermined deflection amount (0.254 mm) was reached, was measured at a load of 1.82 MPa and a heating rate of 2° C./min. The deflection temperature under load of polyaryletherketone A-2 measured under the same conditions is 155° C.

(Raw Materials)

Polyaryletherketone A-1: PEEK (melting point: 340° C., melt flow rate: 12 g/10 minutes, specific gravity: 1.32, manufactured by Daicel-Evonik Ltd., Vestakeep L4000G).

Polyaryletherketone A-2: PEEK (melting point: 340° C., melt flow rate: 22 g/10 minutes, specific gravity: 1.32, manufactured by Daicel-Evonik Ltd., Vestakeep 3300G).

Polyaryletherketone A-3: PEEK (melting point: 340° C., melt flow rate: 53 g/10 minutes, specific gravity: 1.32, manufactured by Daicel-Evonik Ltd., Vestakeep 2000G).

Polyaryletherketone A-4: PEEK (melting point: 340° C., melt flow rate: 142 g/10 minutes, specific gravity: 1.32, manufactured by Daicel-Evonik Ltd., Vestakeep 1000G).

Polyaryletherketone A-5: PEEK (melting point: 340° C., melt flow rate: 87 g/10 minutes, VICTREX (registered trademark) PEEK 150P, manufactured by VICTREX).

Fluorinated elastomer B-1: tetrafluoroethylene-propylene copolymer (crumb shape, melt flow rate: 11 g/10 minutes, specific gravity: 1.55, Mooney viscosity ($ML_{1+10}$, 121° C.): 100, storage elastic modulus G' (100° C., 50 cpm): 390, manufactured by AGC Inc., AFLAS (registered trademark) 150FC).

Ex. 1 to 3

Polyaryletherketone A-1 and fluorinated elastomer B-1 were mixed in a volume ratio as shown in Table 1 and added to the base end of the screw of a twin-screw extruder (KZW15TW-45HG1100, manufactured by Technovel Corporation, screw diameter: 15 mmφ), L/D: 45) at a rate of 2.0 kg/hour by using a feeder. The strand extruded from the die tip under the conditions of screw rotation speed: 200 rpm, set temperatures of cylinder, die and head: C1=340° C., C2=350° C., C3=360° C., C4=370° C., C5=370° C., C6=370° C., D=350° C., H=350° C., was cooled in a water tank and cut by a pelletizer to obtain pellets of the resin composition. The evaluation results are shown in Table 1.

Ex. 4 to 6

Resin compositions were obtained in the same manner as in Ex. 1 to 3 except that polyaryletherketone A-2 was used instead of polyaryletherketone A-1. The evaluation results are shown in Table 2.

Ex. 7 to 9

Resin compositions were obtained in the same manner as in Ex. 1 to 3 except that polyaryletherketone A-3 was used instead of polyaryletherketone A-1. The evaluation results are shown in Table 3.

Ex. 10 to 12

Resin compositions were obtained in the same manner as in Ex. 1 to 3 except that polyaryletherketone A-4 was used instead of polyaryletherketone A-1. The evaluation results are shown in Table 4.

Ex. 13 to 15

Resin compositions were obtained in the same manner as in Ex. 1 to 3 except that polyaryletherketone A-5 was used instead of polyaryletherketone A-1. The evaluation results are shown in Table 5.

TABLE 1

| | | Ex. 1 | Ex. 2 | Ex. 3 |
|---|---|---|---|---|
| Volume ratio (vol %) | Polyaryletherketone A-1 | 90 | 80 | 70 |
| | Fluorinated elastomer B-1 | 10 | 20 | 30 |
| $MFR_A/MFR_B$ | | 1.09 | 1.09 | 1.09 |
| Flexural modulus (GPa) | | 3.7 | 3.1 | 2.6 |
| Izod impact strength (J/m) 23° C. | | 39 | 53 | 82 |
| Izod impact strength (J/m) −40° C. | | 30 | 37 | 36 |
| Number average particle diameter of fluorinated elastomer B-1 in resin composition (μm) | | 0.5 | 1 | 2 |
| Film appearance | | ◯ | ◯ | ◯ |
| Film tensile properties (%) | | 210 | 180 | 150 |
| Bending resistance (number of times till break) | | 1853 | 1923 | 2018 |

TABLE 2

| | | Ex. 4 | Ex. 5 | Ex. 6 |
|---|---|---|---|---|
| Volume ratio (vol %) | Polyaryletherketone A-2 | 90 | 80 | 70 |
| | Fluorinated elastomer B-1 | 10 | 20 | 30 |
| $MFR_A/MFR_B$ | | 2 | 2 | 2 |
| Flexural modulus (GPa) | | 3.6 | 3 | 2.6 |
| Izod impact strength (J/m) 23° C. | | 61 | 61 | 164 |
| Izod impact strength (J/m) −40° C. | | 38 | 37 | 59 |
| Number average particle diameter of fluorinated elastomer B-1 in resin composition (μm) | | 1 | 2 | 3 |
| Film appearance | | ◯ | ◯ | ◯ |
| Film tensile properties (%) | | 280 | 260 | 210 |
| Bending resistance (number of times till break) | | 2034 | 2233 | 2192 |
| Dielectric constant | | 3.08 | 2.9 | 2.86 |
| Deflection temperature under load (° C.) | | 155 | 152 | 151 |

TABLE 3

| | Ex. 7 | Ex. 8 | Ex. 9 |
|---|---|---|---|
| Volume ratio (vol %) Polyaryletherketone A-3 | 90 | 80 | 70 |
| Volume ratio (vol %) Fluorinated elastomer B-1 | 10 | 20 | 30 |
| $MFR_A/MFR_B$ | 4.8 | 4.8 | 4.8 |
| Flexural modulus (GPa) | 3.6 | 2.9 | 2.5 |
| Izod impact strength (J/m) 23° C. | 42 | 41 | 70 |
| Izod impact strength (J/m) −40° C. | 31 | 32 | 30 |
| Number average particle diameter of fluorinated elastomer B-1 in resin composition (μm) | 3 | 4 | 5 |
| Film appearance | ○ | ○ | ○ |
| Film tensile properties (%) | 220 | 200 | 160 |
| Bending resistance (number of times till break) | 291 | 197 | 508 |

TABLE 4

| | Ex. 10 | Ex. 11 | Ex. 12 |
|---|---|---|---|
| Volume ratio (vol %) Polyaryletherketone A-4 | 90 | 80 | 70 |
| Volume ratio (vol %) Fluorinated elastomer B-1 | 10 | 20 | 30 |
| $MFR_A/MFR_B$ | 12.9 | 12.9 | 12.9 |
| Flexural modulus (GPa) | 3.6 | 2.8 | 2.3 |
| Izod impact strength (J/m) 23° C. | 44 | 43 | 43 |
| Izod impact strength (J/m) −40° C. | 27 | 26 | 28 |
| Number average particle diameter of fluorinated elastomer B-1 in resin composition (μm) | 6 | 8 | 10 |
| Film appearance | ○ | x | x |
| Film tensile properties (%) | 89 | 68 | 33 |
| Bending resistance (number of times till break) | 96 | 73 | 97 |

TABLE 5

| | Ex. 13 | Ex. 14 | Ex. 15 |
|---|---|---|---|
| Volume ratio (vol %) Polyaryletherketone A-5 | 90 | 80 | 70 |
| Volume ratio (vol %) Fluorinated elastomer B-1 | 10 | 20 | 30 |
| $MFR_A/MFR_B$ | 7.9 | 7.9 | 7.9 |
| Flexural modulus (GPa) | 3.3 | 2.7 | 2.4 |
| Izod impact strength (J/m) 23° C. | 39 | 42 | 44 |
| Izod impact strength (J/m) −40° C. | 33 | 30 | 28 |
| Number average particle diameter of fluorinated elastomer B-1 in resin composition (μm) | 7 | 12 | 15 |
| Film appearance | ○ | x | x |
| Film tensile properties (%) | 93 | 59 | 28 |
| Bending resistance (number of times till break) | 92 | 97 | 97 |

INDUSTRIAL APPLICABILITY

The molded product of the present invention is excellent in impact resistance, flexibility and bending resistance without impairing the properties (heat resistance, mechanical properties, etc.) of polyaryletherketone, has a low dielectric constant, and has little appearance defects (defects), and thus, it is used in applications where these characteristics are required.

This application is a continuation of PCT Application No. PCT/JP2019/015677, filed on Apr. 10, 2019, which is based upon and claims the benefit of priority from Japanese Patent Application No. 2018-077652 filed on Apr. 13, 2018. The contents of those applications are incorporated herein by reference in their entireties.

What is claimed is:

1. A resin composition comprising a polyaryletherketone and a fluorinated elastomer, wherein the ratio $MFR_A/MFR_B$ of the melt flow rate $MFR_A$ of the polyaryletherketone at a temperature of 372° C. under a load of 49N, to the melt flow rate $MFR_B$ of the fluorinated elastomer at a temperature of 372° C. under a load of 49N, is from 0.2 to 5.0, and the proportion of the volume of the polyaryletherketone in the total of the volume of the polyaryletherketone and the volume of the fluorinated elastomer, is from 60 to 97 vol %, wherein the fluorinated elastomer is an elastic copolymer having no melting point and showing a storage elastic modulus G' of at least 80 at 100° C. and 50 cpm as measured in accordance with ASTM D6204.

2. The resin composition according to claim 1, wherein the fluorinated elastomer is dispersed in the polyaryletherketone, and the number average particle diameter of the dispersed fluorinated elastomer is from 0.5 to 5 μm.

3. The resin composition according to claim 1, wherein the fluorinated elastomer is a fluorinated elastic copolymer having units based on at least one type of monomer selected from the group consisting of tetrafluoroethylene, hexafluoropropylene, vinylidene fluoride and chlorotrifluoroethylene.

4. The resin composition according to claim 3, wherein the fluorinated elastomer is a fluorinated elastic copolymer which further has units based on a monomer selected from the group consisting of ethylene, propylene, a perfluoro (alkyl vinyl ether), vinyl fluoride, 1,2-difluoroethylene, 1,1,2-trifluoroethylene, 3,3,3-trifluoro-1-propylene, 1,3,3,3-tetrafluoropropylene and 2,3,3,3-tetrafluoropropylene.

5. The resin composition according to claim 1, wherein the fluorinated elastomer is selected from the group consisting of a copolymer having units based on tetrafluoroethylene and units based on propylene, a copolymer having units based on hexafluoropropylene and units based on vinylidene fluoride, and a copolymer having units based on tetrafluoroethylene and units based on a compound represented by the following formula I:

$$CF_2=CF(OR^F)$$  Formula I where $R^F$ is a $C_{1-8}$ linear or branched perfluoroalkyl group.

6. The resin composition according to claim 1, wherein the polyaryletherketone is selected from the group consisting of polyetherketone, polyetheretherketone and polyetherketoneketone.

7. A molded product obtained by molding the resin composition as defined in claim 1.

8. The molded product according to claim 7, which is a film, a tube or a fiber.

9. The molded product according to claim 7, which is a film having a thickness of from 1 to 100 μm.

10. A speaker diaphragm comprising a film formed by molding the resin composition as defined in claim 1.

11. A medical catheter comprising a tube formed by molding the resin composition as defined in claim 1.

12. The resin composition according to claim 1, wherein:
the melt flow rate $MFR_A$ of the polyaryletherketone at 372° C. under a load of 49 N is from 1 g/10 min to 53 g/10 min, and
the melt flow rate $MFR_B$ of the fluorinated elastomer at 372° C. under a load of 49 N is from 5 g/10 min to 20 g/10 min.

* * * * *